Feb. 5, 1924.

C. C. HANSEN

CORE BREAKER

Filed June 13, 1922   2 Sheets-Sheet 1

1,482,397

Inventor
Charles C. Hansen.
By His Attorney
Herbert S. Ogden

Feb. 5, 1924.
C. C. HANSEN
CORE BREAKER
Filed June 13, 1922    2 Sheets-Sheet 2
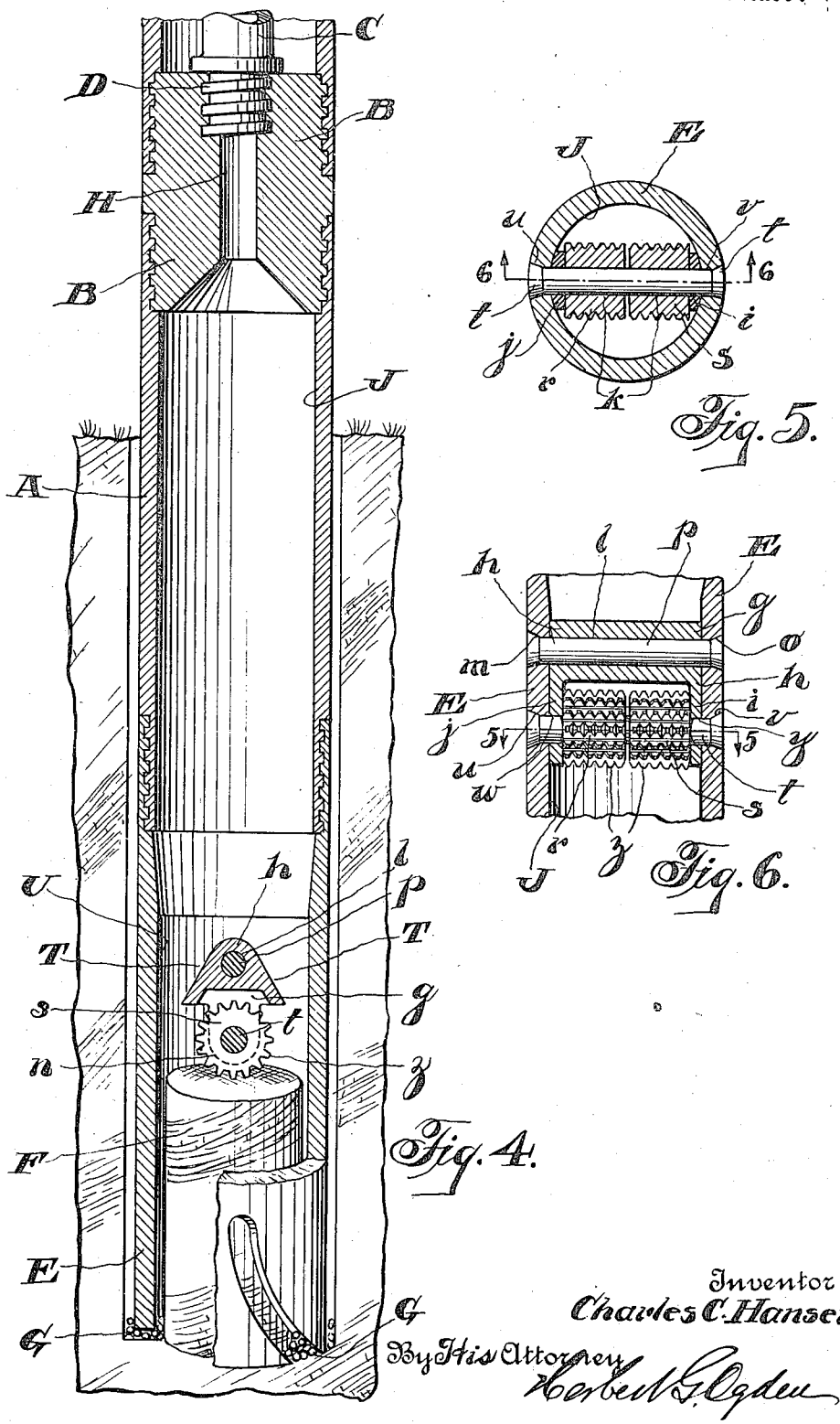
Inventor
Charles C. Hansen
By His Attorney
Herbert G. Ogden Patented Feb. 5, 1924.

1,482,397

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CORE BREAKER.

Application filed June 13, 1922. Serial No. 567,880.

*To all whom it may concern:*

Be it known that I, CHARLES C. HANSEN, a citizen of the United States, and a resident of Easton, in the county of Northampton and State of Pennsylvania, have invented a certain Core Breaker, of which the following is a specification accompanied by drawings.

This invention relates to core drills and particularly to a device for use in combination with a core drill for breaking up or disintegrating the core of material cut by the drill as the drilling progresses.

In drilling operations when using a core drill it frequently becomes desirable to drill a continuous hole instead of extracting cores, or to continue drilling a hole after a core sample has been extracted. In practice a core drill is not generally used for continuous drilling because of the trouble and difficulty in removing the cores, which tend to make a core drill inefficient for such purposes, and a separate drill of satisfactory size is not always available. On the other hand, a core drill is peculiarly adaptable for certain uses especially where holes of considerable depth and diameter are desired, for one reason because the shot bits with which such drills are usually provided are more satisfactory than rotary bits of other types.

One object of the invention is to enable a core drill to be used for continuous drilling to any suitable depth when the extraction of a core of material is not required, by breaking up or disintegrating the core as it is drilled. A further object is to effect such drilling by means of a simple, rugged device which may be used in association with any commercial type of core drill, the device being readily inserted within and easily removed from the core drill at will, thus enabling the core drill to serve a double purpose, i. e. for the extraction of cores or the production of a continuously drilled hole without extracting a core.

These objects and others which will appear hereafter, are accomplished by the construction described in the following specification and illustrated in some of its preferred forms in the accompanying drawings, forming a part hereof, in which:

Figure 4 is a longitudinal sectional elevation similar to Figure 1, showing another form of the invention;

Figure 5, is a transverse sectional view on the line 5—5 of Figure 6 looking in the direction of the arrows; and Figure 6 is a detail vertical sectional view, taken on the line 6—6 of Figure 5 looking in the direction of the arrows.

Figures 1, 2, 3:
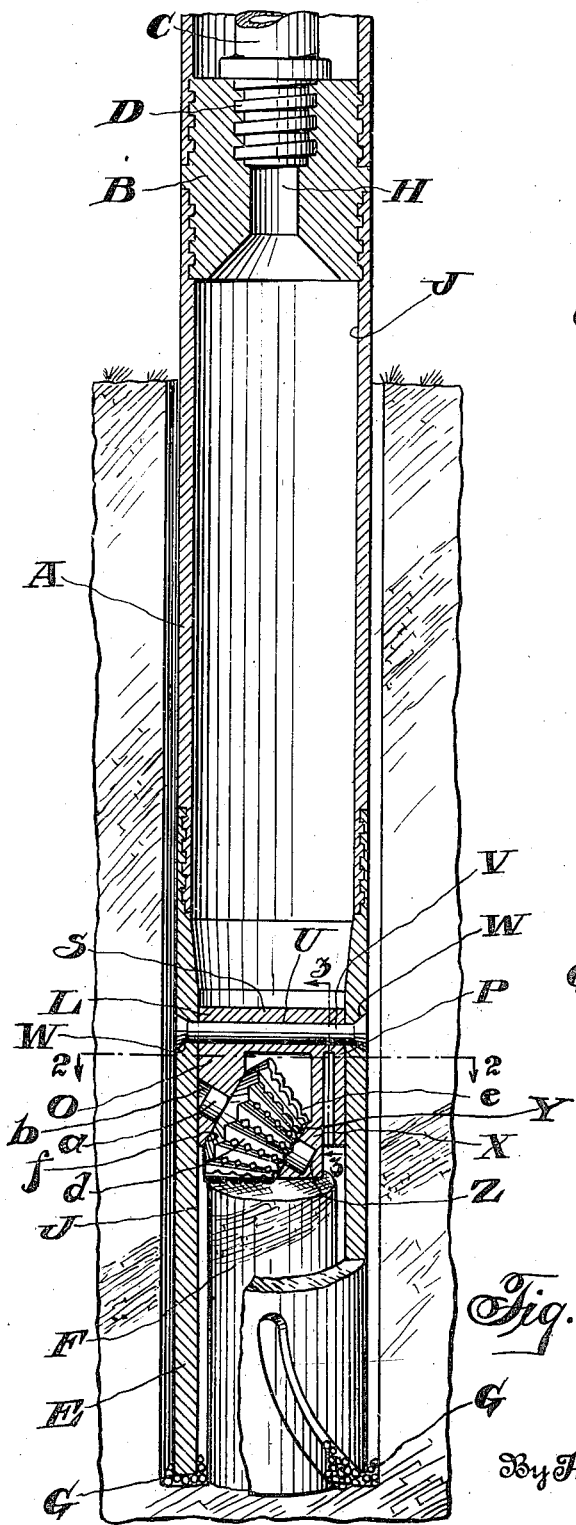
Figure 1 is a longitudinal sectional elevation through the bit end of a core drill showing one adaption of the invention applied thereto.
Figure 2 is a transverse sectional view on the line 2—2 of Figure 1 through the core barrel, looking in the direction of the arrows with the cutting roller removed.
Figure 3 is a detail longitudinal sectional view through the core breaker on the line 3—3 of Figure 1, looking in the direction of the arrows.

Referring to the drawings, the cylindrical hollow bit casing or core barrel A is, in this instance, threaded to a core barrel head B which, as shown, is threaded at D to a hollow drill rod C in any desired manner. The drill rod C and hence the core barrel A are rotated in a well known manner so that the cutting edge of the bit E cuts a core F of material. Cutting material, as for instance, shot G for this purpose, is fed, together with water under pressure, through the hollow drill rod C to a passage H in the head B and from thence is carried by centrifugal action along the inside J of the core barrel A to the cutting edge of the bit E at the bottom of the hole being drilled.

The core breaking device is removably secured within the cylindrical core barrel A at a point any desired distance above the cutting edge of the bit E, and includes a hollow housing or supporting frame L having curved ends O and P adapted to fit the inside of the core barrel A and also having flat sides Q and R. The housing is provided with a crown S at its upper end, having sloping sides T forming a shield and a transverse hole U is provided for a securing pin V. The ends of the pin V are riveted or otherwise secured in corresponding apertures W in the core barrel A thus holding the housing within the barrel. The housing L has a depending web X formed adjacent to the end P and has, at its lower end, an offset upwardly inclined bearing face Y with a socket Z for receiving the end of a short roller pin or shaft $a$. The other end of the shaft $a$ is supported in a hole $b$ located in the end O of the housing, and in alignment with the socket Z, and at an angle to the horizontal. The bearing face $f$ of the end O of this housing is downwardly inclined to accommodate the cutter $d$.

The cutter $d$ is mounted on the shaft $a$ and is preferably in the form of a frustro conical roller having a plurality of milled and beveled cutting edges or surfaces $e$. The roller $d$ is adapted to rotate freely on the shaft $a$, and is so positioned that the cutting edges $e$ project below the lower end of the web X. The angular shape of the conical roller $d$ is such that the cutter presents a series of horizontally disposed toothed cutting edges which successively engage the top of the core of drilled material. As the core barrel A rotates, the cutting roller will be rotated upon the upper end of the core, and the cutting edges will engage the core with heavy pressure and grind, break up or disintegrate the core as the drilling progresses.

The detritus produced in the operation of breaking up the core is forced or washed out of the hole with the cuttings from the cutting edges of the bit E by the water which is usually admitted to the drill with the shot. The interior of the housing is open, making the construction as light as possible, and the water and shot have a free passage from the crown S down both sides T of the housing, as illustrated particularly in Figure 3 to the cutting edge of the bit as seen in Figure 1.

The housing may be located at any desired height above the cutting edge of the bit by properly drilling the holes W in the core barrel A to accommodate the pin V. When inserting the core breaker in the core barrel the cutter $d$ is first placed in position between the two inclined faces Y and $f$ of the housing, and the pin or shaft $a$ is then dropped through the hole $b$, the opposite end finding lodgement in the socket Z. The housing including the cutter $d$ is then inserted in the core barrel and pushed up until the hole U in the upper portion of the housing L is in alignment with the holes W previously located at the desired height at opposite sides of the core barrel. The pin V is then passed through the aligned holes and the ends of the pin riveted, thus securely holding the housing within the barrel.

Referring to Figures 4, 5 and 6, another form of housing $g$ is shown consisting of a crown, or body portion $h$ extending diametrically across the core barrel A and having opposite depending ends $i$ and $j$, curved to fit the inner surface of the core barrel A. The housing $g$ is relatively narrow in width, allowing free passage for the water and shot past the sides of the housing and around the outside of the core to the cutting edge of the bit. The housing $g$ is secured within the core barrel A at the desired height in the same manner as in the form of the invention illustrated in Figure 1, and for this purpose a transverse hole $l$ in the body portion $h$ is aligned with opposite holes $m$ and $o$ in the wall of the core barrel A, and a pin $p$ is passed through the aligned holes and riveted at the ends flush with the exterior of the core barrel A.

A plurality of cutting rollers $r$ and $s$, in the present instance two, are mounted below the body $h$ of the housing on a shaft $t$, which passes through opposite holes $u$ and $v$ in the wall of the core barrel A below the holes $m$ and $o$ and also through the aligned holes $w$ and $y$ in the ends $i$ and $j$ of the housing and through the axial holes $k$ in the rollers $r$ and $s$, the ends of the shaft $t$ being riveted in the wall of the core barrel A. The housing $g$ is thus secured at four points, two of these points being in axial alignment with the cutting rollers $r$ and $s$, thus making the construction rigid.

The rollers $r$ and $s$ are cylindrical in shape and present a plurality of series of horizontal cutting edges $z$, extending below the lower end of the housing $g$ in position to engage the top of the core. The rollers $r$ and $s$ are rotated in opposite directions as the core drill rotates, resulting in a powerful grinding and cutting action.

The housing $g$ is inserted and secured within the core barrel A in substantially the same manner as in the previously described form. After the housing has been secured in the core barrel, the cutting rollers $r$ and $s$, are placed between the inner faces of the end portions $i$ and $j$ with the holes $k$ in alignment with the holes $w$ and $y$, and $u$ and and $v$, and the shaft $t$ is then passed through the aligned holes from the outside of the core barrel and the ends riveted.

I claim:

1. In combination, a core drill including a cylindrical core barrel, a shot bit, means for supplying cutting material through the core barrel to the cutting edge of the bit, and a core breaking device located axially within the core drill and including a cutter presenting a horizontally disposed cutting edge, said core breaking device permitting the passage of the cutting material to the bit and being adapted to be mounted above the cutting edge of the shot bit and being capable of breaking or disintegrating the core of material drilled by the shot as the drilling progresses.

2. In combination, a core drill including a core barrel, a shot bit adapted to cut a cylindrical core, means for supplying cutting material through the core barrel to the cutting edge of the bit, and a core breaking device adapted to be secured within the core barrel above the cutting edge of the shot bit, said core breaking device permitting the passage of the cutting material to the bit and comprising a housing, means for securing said housing within the bit casing and cutting means mounted within the housing adapted to engage the top of the core of drilled material as the drilling progresses to break up or disintegrate the core.

3. In combination, a core drill including a core barrel, a shot bit adapted to cut a cylindrical core, means for supplying cutting material through the core barrel to the cutting edge of the bit, and a core breaking device adapted to be rigidly secured within the core barrel above the cutting edge of the shot bit, said core breaking device permitting the passage of the cutting material to the bit and comprising a housing, means for securing said housing within the core barrel and rotary cutting means mounted within the housing, said cutting means being rotated by engagement with the core and acting to break up or disintegrate the core as the drilling progresses.

4. In combination, a core drill including a core barrel, a shot bit adapted to cut a cylindrical core, means for supplying cutting material through the core barrel to the bit, and a core breaking device adapted to be rigidly secured within the core barrel above the cutting edge of the shot bit, said core breaking device permitting the passage of the cutting material to the bit and comprising a housing within the core barrel and cutting means mounted within the housing, said cutting means including a plurality of cutting edges adapted to successively engage the top of the core of drilled material to break up or disintegrate the core as the drilling progresses.

5. In combination, a core drill including a core barrel, a shot bit adapted to cut a cylindrical core, means for supplying cutting material through the core barrel to the bit, and a core breaking device adapted to be rigidly secured within the core barrel above the cutting edge of the shot bit, said core breaking device permitting the passage of the cutting material to the bit and comprising a housing, a pin passing diametrically through the barrel and housing for rigidly securing the housing in position within the casing, a shaft within said housing, and a cutter mounted on said shaft, said cutter including a plurality of cutting edges adapted to be rotated by engagement with the core and acting successively to break up or disintegrate the core as the drilling progresses.

In testimony whereof I have signed this specification.

CHARLES C. HANSEN.